May 4, 1926.
W. A. VAN LUVEN
1,582,945
PIE MAKING MACHINE
Original Filed May 3, 1923   5 Sheets-Sheet 3
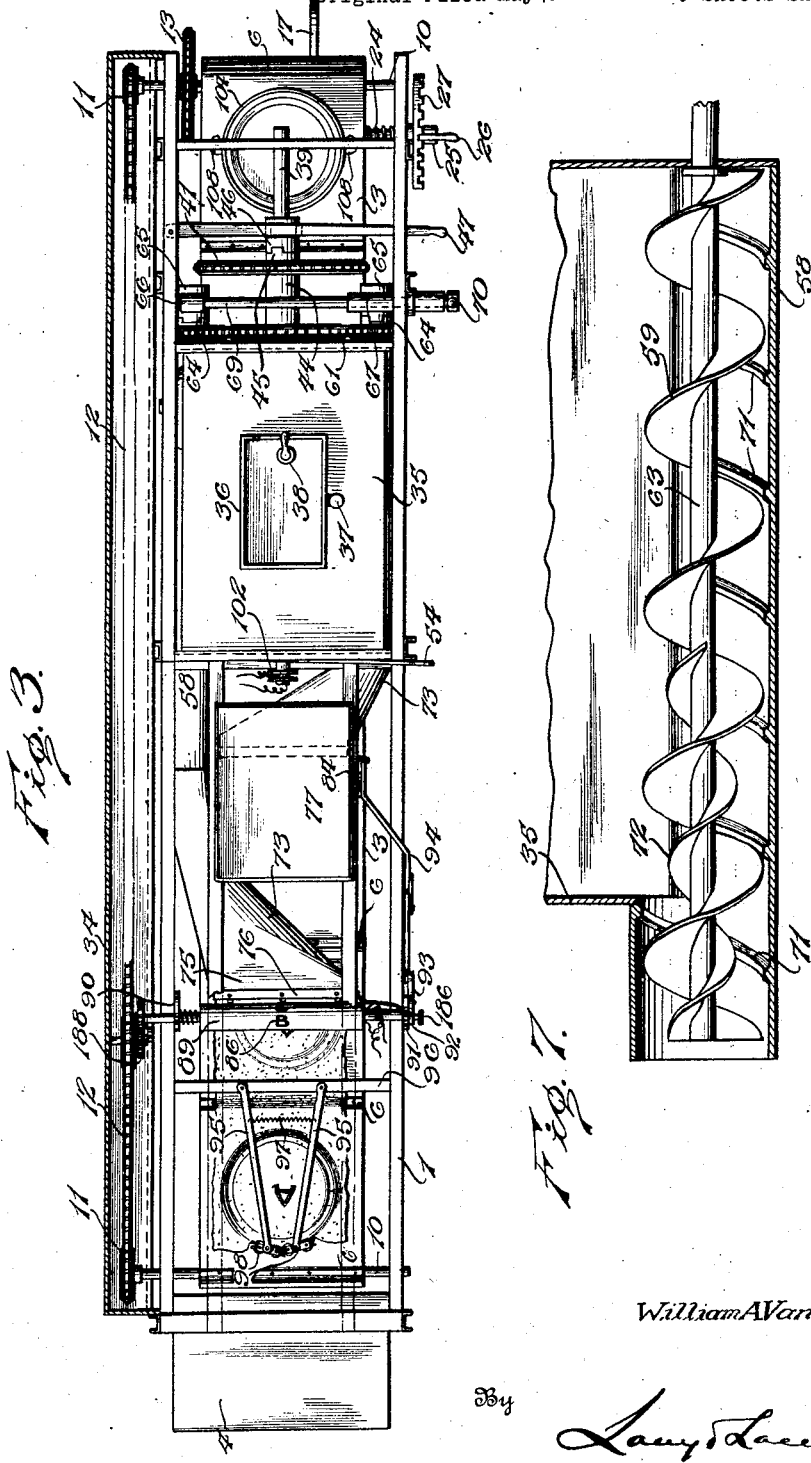
Inventor
William A Van Luven
By
Lacy & Lacy, Attorneys

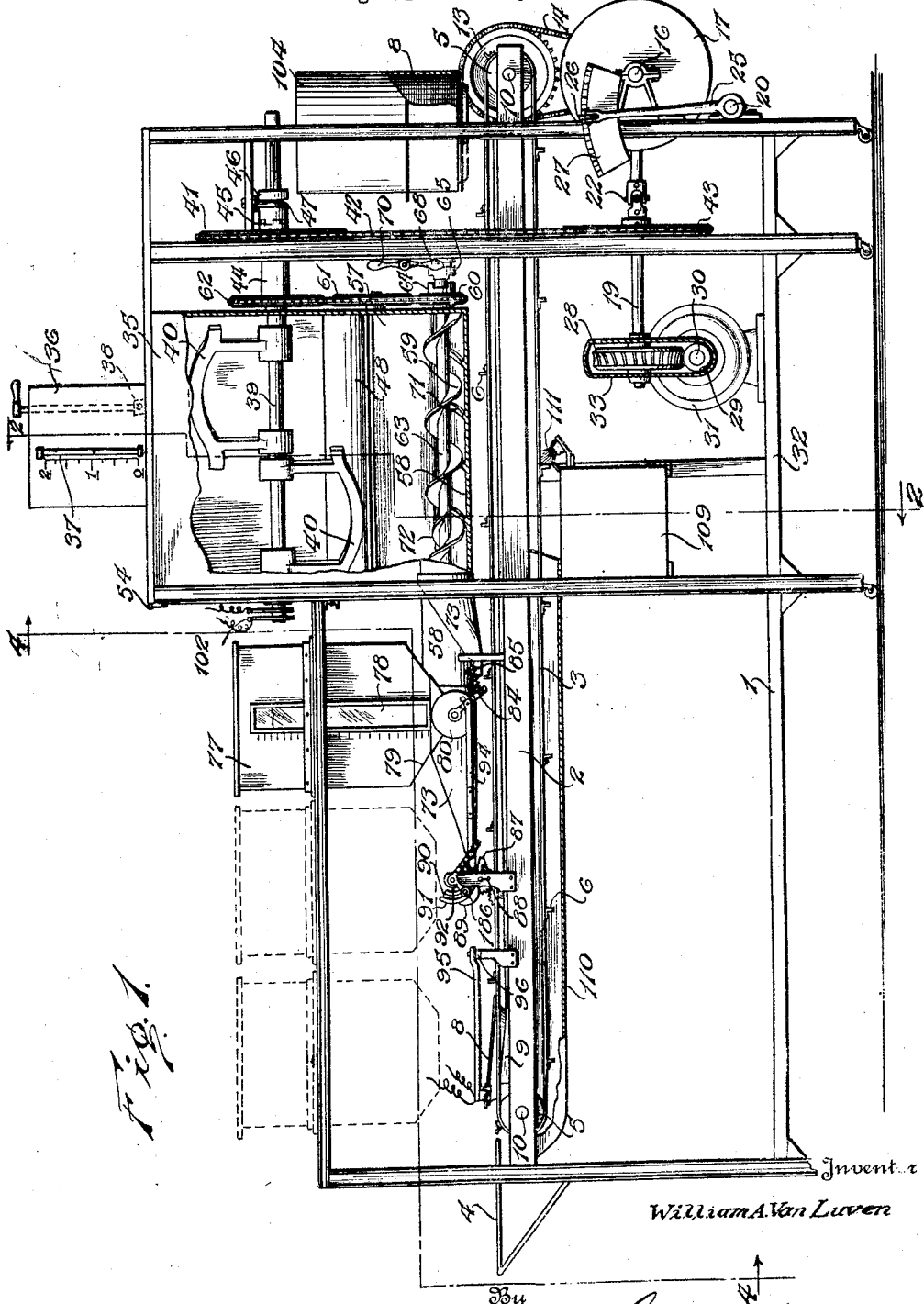

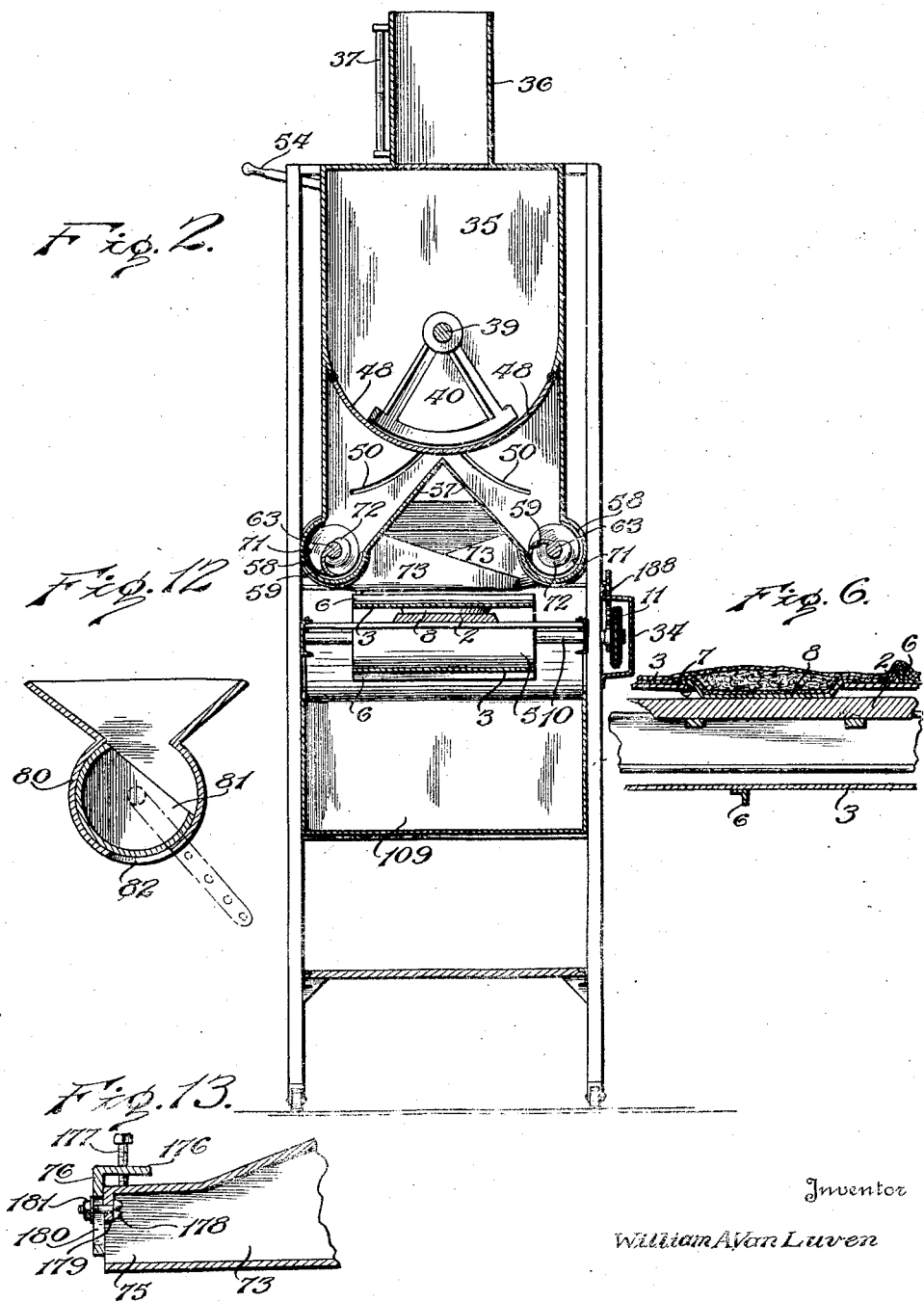

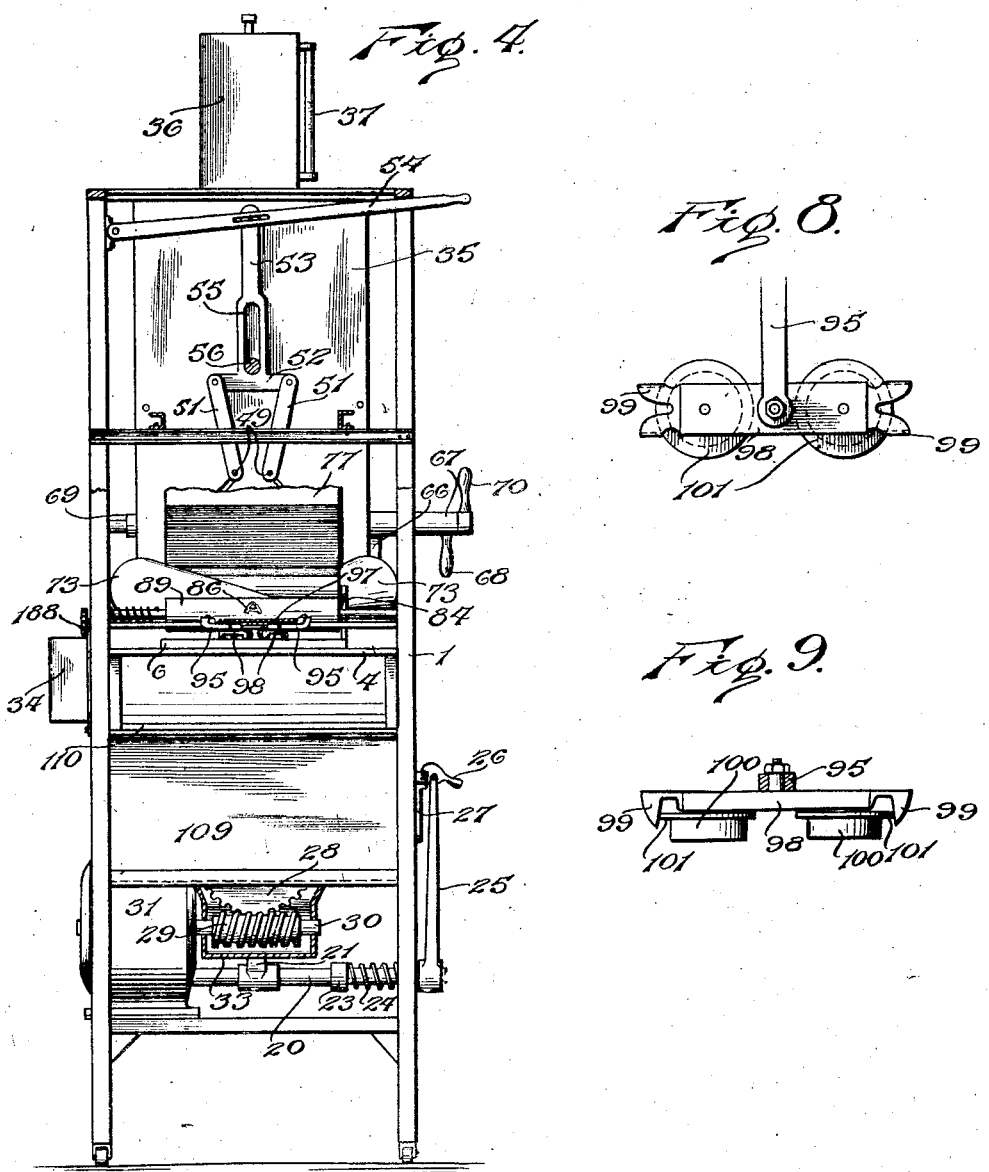

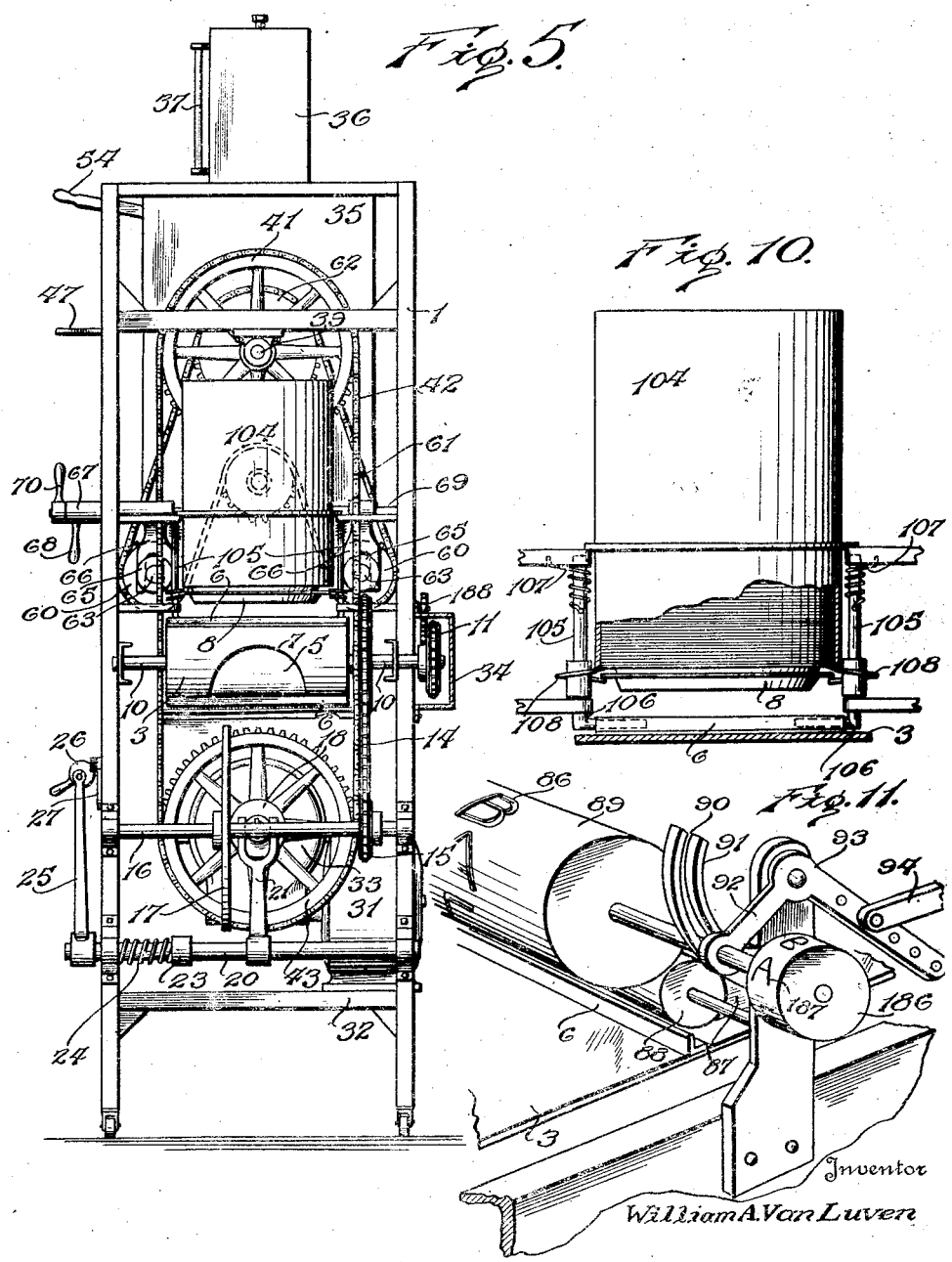

Patented May 4, 1926.

1,582,945

UNITED STATES PATENT OFFICE.

WILLIAM A. VAN LUVEN, OF RAPID CITY, SOUTH DAKOTA.

PIE-MAKING MACHINE.

Application filed May 3, 1923, Serial No. 636,501. Renewed February 15, 1926.

*To all whom it may concern:*

Be it known that I, WILLIAM A. VAN LUVEN, a citizen of the United States, residing at Rapid City, in the county of Pennington and State of South Dakota, have invented certain new and useful Improvements in Pie-Making Machines, of which the following is a specification.

This invention has for its object the provision of an automatic machine whereby pies will be made and delivered ready to be placed in an oven for baking. The invention seeks to provide a machine in which the pie pans will be taken automatically and singly from a supply at one end and conveyed continuously to the opposite end of the machine receiving in the travel a portion of dough to form the lower crust, a filler, and a portion of dough to form an upper crust, the upper crust being suitably marked to indicate the character of the filling and the surplus dough being subsequently trimmed from the pie and the edges of the two crusts pressed together. The invention also provides means whereby the dough trimmings will be carried to a suitable receptacle and reclaimed. These stated objects, and other objects of the invention which will incidentally appear in the course of the following description, are attained in such an apparatus as is illustrated in the accompanying drawings.

In the drawings:—

Figure 1 is a side elevation, with parts broken away and in section, of a pie-making machine embodying the invention;

Fig. 2 is a transverse section on the line 2—2 of Fig. 1;

Fig. 3 is a plan view of the machine;

Fig. 4 is a sectional end elevation, the section being taken on the line 4—4 of Fig. 1;

Fig. 5 is an end elevation showing the machine from the end opposite to that viewed in Fig. 4;

Fig. 6 is an enlarged detail section of a portion of the conveyer showing the manner in which a pie is supported thereby;

Fig. 7 is an enlarged longitudinal section through one of the dough feeders;

Fig. 8 is an enlarged detail plan view of the trimmer;

Fig. 9 is an enlarged elevation of the same;

Fig. 10 is a sectional elevation of the magazine which holds a supply of pie pans, this figure illustrating the means for feeding the pans to the conveyer;

Fig. 11 is an enlarged perspective view of the marking mechanism;

Fig. 12 is a detail section of the means for controlling the supply of filler, and Fig. 13 is an enlarged detail section of a dough-delivery gage.

In carrying out my invention, I employ a suitable frame, indicated by the numeral 1, which may be of any substantial suitable construction. Extending longitudinally of this frame is a deck 2 which constitutes a support for the upper run of an endless belt conveyer 3, a delivery table 4 being provided at one end of the frame to receive pies from the said belt conveyer. This conveyer is supported at its ends by drums or rollers 5 and at intervals upon the conveyer are transverse brackets or cleats 6 which prevent backward movement of pans deposited upon or in the belt and also serve as trippers for certain mechanism which will be hereinafter described. The belt is provided between successive brackets with openings 7 of a proper diameter to receive the pie pans 8 with the flanges of the pans resting upon the upper surface of the belt, as shown most clearly in Fig. 6. It will be readily understood that the pans are supported upon the deck 2 and are moved along the same by the conveyer or belt, and upon the deck, adjacent the delivery end of the conveyer, is an inclined surface 9 up which the pans with the pies therein will be caused to travel by the movement of the belt so that they will be carried onto the delivery table 4, as will be readily understood upon reference to Fig. 1. The drums or rollers 5 are carried by axles or shafts 10 which are journaled in the side beams of the deck 2 and are provided at the rear side of the machine with sprockets 11, around which is trained a sprocket chain 12 so that both drums or rollers will be positively driven and they will operate at the same speed. Motion is imparted to the conveyer through a sprocket gear 13 secured upon one shaft 10 and operatively connected by a chain 14 with a sprocket 15 on a transverse shaft 16. The shaft 16 is journaled in suitable bearings upon the lower portion of the frame and has fitted thereon a friction pulley 17 which has its periphery in contact with a friction pulley 18 fitted slidably upon the main shaft 19 of the machine but constrained to rotate therewith. A rocking bar 20 is mounted upon the end of the frame below the shafts 16 and 19, and a forked arm 21 is secured upon the said bar and is engaged at its upper end with the hub of the friction pulley 18, it being noted, particularly upon reference to Fig. 1, that the shaft 19 is constructed in sections connected by a universal joint 22 and that the friction pulley 18 is carried by the outer end section of said shaft. It will be readily understood that rocking of the bar 20 will swing the arm 21 so that the pulley 18 will be shifted radially of the pulley 17 and speed of the latter reduced to any desired degree, the speed of the conveyer belt 3 being thus easily and accurately regulated. The bar 20 carries or is constructed with an abutment or shoulder 23, and a spring 24 is coiled around the bar between the said abutment and the adjacent side of the main frame, with its ends secured to the bar and the frame, respectively, so that the spring by its expansion tends constantly to rock the bar outwardly and thereby hold the pulley 18 close to the center of the pulley 17. On the front extremity of the bar 20 is secured a lever 25 whereby the bar may be manually rocked, and upon the upper end of this lever or handle member is mounted a locking cam or eccentric 26 which is adapted to bear against and engage any one of a series of notches in a quadrant or holding plate 27 fixed upon the side of the frame so that the arm 21 and, consequently, the pulley 18 will be held in any position in which they may be set. The inner end of the shaft 19 is equipped with a worm gear 28 which meshes with a worm 29 upon the shaft 30 of a motor 31 which may be of any convenient type and is preferably an electric motor, as illustrated conventionally in the drawings. The motor is carried upon a support 32 forming a part of the main frame, and the worm gearing serves to reduce the speed between the motor shaft and the main shaft 19 in an obvious manner. A gear casing 33 is fitted about the gears 28 and 29 so as to prevent damage to these parts, and a gear casing 34 is secured upon the rear side of the frame around the chain 12 and the sprockets 11 for a similar purpose.

The flour and other ingredients necessary to form dough are fed into a mixer chamber or hopper 35 manually or by the use of a mechanical feeder as may be most advantageous under any particular conditions. The said mixer chamber is supported by and within the upper portion of the frame, and above the said chamber a tank 36 is supported so that water may be supplied as needed. This tank is equipped with a sight glass or gage tube 37 of any convenient construction and is also provided with a cut-off valve 38, illustrated conventionally, whereby to control the flow of water from the tank into the mixing chamber. Extending longitudinally through the mixing chamber and journaled in the side walls thereof is a mixing or kneading shaft 39 having paddles or kneading blades 40 carried thereby. The shaft is extended beyond the walls of the mixing chamber and one end is journaled in suitable bearings upon the main frame. A sprocket 41 is mounted upon this shaft and is operatively connected by a chain 42 with a sprocket 43 upon the shaft 19. The hub 44 of the sprocket 41 is loosely mounted upon the shaft 39 and is constructed at one end with a clutch face 45 adapted to be engaged by a clutch sleeve 46 which is slidably mounted upon the said shaft but is constrained to rotate therewith and is controlled by a lever 47 mounted upon the frame and projecting to the front side of the same whereby the clutch sleeve may be shifted so as to lock the hub 44 to the shaft when it is desired to have the shaft rotate. The mixer or kneader can thus be thrown into or out of operation as may be desired without stopping the motor, and the operator is thus enabled to arrest the formation of dough if the supply should be greater than is needed for immediate use, but the operation of the belt may continue until the supply of dough on hand has been used or the available supply of pie pans has been exhausted.

The bottom of the kneading chamber 35 is arcuate or semi-circular and consists of downwardly swinging doors 48 each provided at one end with a pin 49 extending through a slot 50 formed in the adjacent end wall of the chamber concentric with the hinge of the door. These pins or studs 49 are pivotally engaged in the lower ends of links 51 which are pivoted at their upper ends to a crosshead 52 on the lower end of a pusher rod 53 which is slidably mounted upon an end of the kneading chamber and has its upper end operatively connected with a hand lever 54 which is fulcrumed at its rear end upon the frame and projects forwardly beyond the front side of the same. The pusher bar 53 is constructed with a slot 55 engaging a guide 56, (which may be the end of the shaft 39) upon the end wall of the kneading chamber so that it will be held to a rectilinear path in movement, and it will be readily understood that pressure exerted upon the lever 54 will depress the crosshead 52 and transmit the downward movement through the links 51 and the studs 49 to the doors 48 so that the doors will be swung downwardly and the dough permitted to escape. Immediately below the mixing chamber is a deflector or guide 57 consisting of downwardly diverging plates having their upper edges jointed immediately below the meeting free edges of the doors 48, as clearly shown in Fig. 2. The lower edges of these plates merge into tubular conveyer casings 58 which extend longitudinally of the frame at the front and rear sides of the same, and in the said casings are mounted spiral conveyers or screws 59, the shafts of which project through one end wall of the respective casings and are equipped with sprockets 60 loosely mounted thereon. A sprocket chain 61 is trained around the sprockets 60 and around a sprocket 62 secured upon the hub 44 so that, when the mixer shaft 39 is rotating, the conveyer shafts 63 will also rotate and the dough will be thereby fed to the discharge end of the respective tubes. Each sprocket 60 is provided with a clutch hub 64 adapted to be engaged by a clutch sleeve 65 which is mounted upon the conveyer shaft immediately adjacent the sprocket and is slidable on the shaft but constrained to rotate therewith. The forward clutch sleeve 65 is controlled through a fork 66 depending from a hollow shaft 67 supported upon the main frame and provided at its front end with a handle or lever 68, while the rear clutch sleeve 65 is controlled by a similar fork secured upon a shaft 69 extending through the hollow shaft 67 and equipped at its front end with a lever or handle member 70, the levers or handles 68 and 70 extending in opposite directions in their normal positions so that either handle may be manipulated without interference from the other handle. Either conveyer may be thus set in motion or thrown out of operation without affecting the other conveyer and without affecting the operation of the kneader so that the formation of the dough and the feeding of the same to the points of delivery may be independently controlled. It will be readily noted, however, that normally the feeders will operate whenever the mixer or kneader is operating. The feeder casings are extended at their delivery ends beyond the end wall of the kneading chamber and upon the interior surface of the feeder casings, I form spiral ribs 71 which co-operate with the spiral blade of the feeder screw to prevent backward movement of the dough or an accumulation of the same at any one point of the casing. I also provide at the delivery end of the screw a supplemental spiral blade 72 which is of less radius than the main blade 59 and has its convolutions disposed alternately with the convolutions of the main blade. Each feeder casing is equipped at its delivery end with a nozzle 73 which may be removably fitted to the end of the casing so as to facilitate the assembling of the parts when setting up the machine. The attaching end of the nozzle is, of course, circular to fit about the circular feeder casing, while the intermediate portion of each nozzle consists of upper and lower walls converging toward the delivery end of the nozzle and side walls diverging toward said delivery end whereby the nozzle will have a flaring form and will have its mouth or delivery end disposed transversely of the conveyer belt 3 and extend nearly the entire width of the blade, the mouth being contracted so as to deliver the dough in a comparatively thin sheet, as will be readily understood upon reference to Figs. 3 and 13, where the delivery end of the nozzle is indicated at 75. In order that the thickness of the sheet of dough may be regulated as desired a gage plate 76 is secured upon the mouth of the nozzle and projects more or less across the opening therein, as may be desired. The gage plates 76 are provided with flanges 176 at their upper edges which overhang the nozzles 73 and in which are mounted set bolts 177 which bear upon the nozzle and by the manipulation of which the respective gage may be adjusted vertically so that the lower edge thereof will be set at a greater or less distance from the bottom of the nozzle to regulate the thickness of the issuing sheet of dough. The gage is held to the nozzle by bolts 178 mounted in a flange 179 on the top wall of the nozzle and passing through vertical slots 180 in the gage to accommodate the vertical adjusting movement of the gage. Nuts 181 are mounted on the bolts 178 to secure the gage firmly in place after it has been adjusted. As will be readily understood upon reference to Figs. 1 and 3, the front feeder casing is shorter than the rear feeder casing so that the dough delivered from the forward nozzle will be received in a pie pan to form the lower crust and the dough delivered from the rear nozzle will be received later to form the upper crust, the filling being delivered between the respective sheets of dough.

Supported upon the frame adjacent the delivery end of the kneading chamber is a reservoir 77 for the pie filling, and this reservoir will preferably be equipped with a sight glass 78 so that the quantity of filling in the reservoir may be observed at all times. As indicated by dotted lines in Fig. 1, a plurality of reservoirs may be mounted upon the frame for convenience in replenishing the supply of filler or for quickly substituting one filler for another. The lower end of the reservoir is tapered, as shown at 79, and leads into a transverse cylindrical casing 80 in which is mounted a rotatable cut-off 81, a delivery outlet 82 being provided in the bottom of the casing 80. The tubular casing 80 constitutes a measuring chamber and the cut-off 81 is preferably in the shape of a somewhat elongated cup or trough having a capacity equal to the filling needed for one pie. This cut-off is carried by trunnions 83 mounted in the ends of the casing, and the front trunnion has secured thereto a rocking arm or trip lever 84 which normally extends downwardly and toward the kneading chamber and is yieldably held in that position by a spring 85 in an obvious manner. The lower end of the trip lever projects normally into the path of the brackets 6 upon the conveyer belt 3 so that as the upper run of the belt passes under the dough-delivering nozzles, the brackets will successively engage the lower end of the trip lever and each will carry the same forward for a short distance thereby rocking the cut-off 81 so that the portion of the filler contained in the cut-off will be discharged and at once pass onto the dough in the pan following the actuating bracket. As soon as the trip lever has cleared the bracket 6, the spring 85 will return the parts to the normal position. Adjacent the delivery end of the rear nozzle 73 is a flouring roller 88 which extends transversely above the conveyer belt 3 and is so disposed as to just clear the bracket 6 and the pies. This roller 88 runs in the front of a box 87 containing a supply of flour so that the dough of the pie crust will not adhere thereto, and the dough delivered from the rear or second nozzle passes over this roller before passing onto the pie. The flouring roller may be positively driven by the chain 12 through gearing indicated at 188. Immediately above the flouring roller 88 is a marker roller 89 which has its trunnions mounted in the slots 90 of arcuate arms 91 extending from the supports in which the roller 88 is mounted. The trunnions of this marker roller are carried by cranks 92 which are pivotally hung upon the supports for the idler roller 88 and above said roller. The forward crank 92 is rigid with a crank or rocking arm 93 which, in turn, is connected by a link 94 with the rocker arm 84. It will thus be seen that, when the rocker arm 84 is actuated to effect a discharge of filler, the marker roller will be lifted so that it will not interfere with the initial movement of the dough delivered from the nozzle 73, which dough passes over the roller 88, as has been stated. As soon, however, as the rocker arm 84 returns to its initial position, the marker roller will be lowered through the described connections so that it will act upon the delivered dough and suitably mark the same to indicate the kind of filler which has been placed in the pie, the roller 88 serving as a platen to support the dough under the marking pressure. The marker roller is provided with a circumferential series of dies or marker elements 86 and it is rotatable in the cranks 92 to bring the proper die into marking position. An index or thumb wheel 186 is secured on the front trunnion of the marker wheel and is provided around its periphery with indicators 187 corresponding to the dies 86 so that the position of the thumb wheel will denote which element 86 is in the marking position. Rotation of the thumb wheel will, of course, rotate the marker roller so as to properly set it.

Beyond the marker roller and over the pie-lifting element 9, I provide devices for trimming and crimping the edges of the pies. These devices comprise a pair of levers or horizontally swinging arms 95 pivoted at their inner ends upon a cross bar or support 96 of the main frame and spaced equidistantly from the longitudinal center of the conveyer belt. A spring 97 extends between and is secured to these arms so as to hold their free ends normally together and at the free ends of the arms are swiveled heads 98 provided at their ends with scrapers or knives 99 adapted to engage the edge of the pie and, by bearing against the same, trim off the dough projecting beyond the edge of the pie pan. On the under side of each head 98 at both ends thereof, I mount rollers 100 having flanges 101 at their upper ends, which rollers are adapted to bear against the edges of the pies and overlap the same so as to press the edges of the two crusts firmly together and shape the same. As a pie is carried against the trimmers, which are held directly at the center of the line of travel, as shown in Fig. 3, the forward movement of the pies, presenting a curved surface to the trimmers and crimpers, will move the crimpers and trimmers apart so that the pie will pass between them and they will be caused to travel relatively around and to the rear of the pie. Inasmuch as the crimpers and trimmers are swiveled upon the free ends of the arms 95, and tend constantly to approach under the influence of the spring 97, they will be permitted to follow the edge of the pie notwithstanding the varying angular relation of the pie and the crimpers and will, consequently, act upon the entire edge of the pie so that it will be completely finished.

To prevent the crimpers and the kneaders becoming so chilled so that the dough will stick to them, I provide electric contacts of any convenient form whereby current may be conveyed to the kneader shaft and to the crimpers to maintain the same at a proper temperature for successful operation. These electrical connections are indicated conventionally at 102 and 103. The marker roller may be similarly equipped.

At the end of the machine remote from the delivery end thereof, I provide a magazine or holder 104 in which the pie pans 8 are placed in nested relation. This magazine or holder may conveniently be a vertical cylinder having open ends and of a diameter to receive the pie pans snugly so that they will be properly supported but capable of ready vertical movement when they are to be delivered. Adjacent the front and rear of this holder at the lower end thereof, vertically disposed spindles 105 are rotatably mounted in the frame of the apparatus, and these spindles are provided at their lower ends with lateral arms 106 which project inwardly from the spindles over the conveyer belt 3 into the path of the brackets 6 thereon. Springs 107 connected with the upper ends of the spindles and adjacent portions of the frame hold the spindles normally in such position that the arms 106 will project over the belt and upon the lower ends of the spindles are formed spirally disposed ribs 108 which are adapted to engage the pans successively and permit them to drop singly to the conveyor belt. The spiral rib 108 extends around the spindles slightly less than one complete turn so that there will be a small space between the vertical planes of the ends of each rib. Referring particularly to Fig. 10, it will be understood that, when the travel of the belt 3 brings a bracket or cleat 6 into engagement with the arms 106, the said arms will be caused to swing through an arc of ninety degrees until the bracket clears the arms, whereupon the springs 107 will return the parts to initial position. When the spindles 105 are thus turned, the lower end of the spiral rib 108 is at once carried from under the lowermost pan 8 and said pan drops into the opening of the belt 3 which at that time will be directly under the pie pan holder or magazine. The pan immediately above the lowermost pan will be engaged and supported by the rib 108 and the rib will ride under said pan during the initial turning movement of the spindles. Upon the return movement, however, the pan will ride on the rib until the upper end of the rib clears the pan, whereupon the pan will drop and will be caught by the lower end of the rib and sustained thereby until it is to be fed to the conveyer belt. The space between the ends of the rib is of just such extent that the time required for the pan to drop from the upper end of the rib to the lower end thereof will be equal to the time required for the lower end of the rib to pass into position to support the pan. The pans will thus be fed singly and successively to the conveyer belt and will be carried by the belt under the dough-delivering means and the filler spout so that, when the pan reaches the delivery end of the belt, it will carry a complete pie ready for baking.

Disposed below the conveyer belt at any convenient point of the main frame, and preferably adjacent the center thereof, is a receptacle 109 for dough clippings. Disposed in relatively close proximity to the under run of the conveyer belt 3 and extending from the delivery end of the belt to the said receptacle 109 is a plate or board 110 along which the dough clippings may be fed by the brackets upon the under run of the belt until they are delivered into the receptacle 109. At the top of the said receptacle, and upon the far side thereof in the direction of travel of the lower run of the belt, is a brush 111 which bears constantly against the belt and serves to remove therefrom any particles of dough which are adhering thereto so that the said particles will be brushed into the receptacle 109 and waste of the same will be prevented.

It is thought the operation of the machine will be readily understood from the foregoing description, taken in connection with the accompanying drawings, and it will be noted that by my apparatus pies will be automatically produced as long as a supply of the necessary ingredients is maintained in the kneading chamber and in the filler reservoir. The machine operates steadily and continuously and requires very little attention upon the part of the operator. None of the material is handled by the operator so that the finished pies will be free from all possible contamination and they will be produced more easily and rapidly than is possible by mere manual labor.

Having thus described the invention, what is claimed as new is:

1. A pie-making machine comprising a belt for carrying pans successively to a filling point, means for delivering upper and lower sheets of dough upon the pans, means for delivering a measured quantity of filler between the sheets of dough, and brackets on the belt between the pans to actuate the filler-delivering means.

2. A pie-making machine comprising a belt for carrying pans successively to a filling point, means for delivering sheets of dough upon the pans successively, means for delivering a measured quantity of filler between the sheets of dough on each pan, and means on the belt for operating the filler-delivering means.

3. A pie-making machine comprising a kneading chamber, dough-forming means within the said chamber, a pair of feeders disposed below and in communication with the kneading chamber and extending beyond one end of the same, means for carrying pie pans singly and successively past the delivery ends of said feeders to receive sheets of dough therefrom, and means for delivering a filler between the sheets of dough.

4. A pie-making machine comprising a kneading chamber, kneading devices within the said chamber, a pair of feeders disposed below and extending beyond one end of the kneading chamber, a deflector extending from the bottom of the kneading chamber upon divergent lines to the said feeders, and means for effecting discharge of dough from the kneading chamber upon the said deflector and into the feeders.

5. A pie-making machine comprising a kneading chamber, arcuate doors forming a bottom for said chamber and hingedly supported at their outer edges, kneading mechanism within the chamber above said doors, a crosshead slidably mounted upon one end of the kneading chamber, connections between said crosshead and the doors, means for moving the crosshead vertically in a rectilinear path whereby to open or close the doors, feeders disposed below and at the front and rear of the kneading chamber, and means for directing dough from the kneading chamber into said feeders.

6. A pie-making machine comprising a kneading chamber, tubular feeder casings disposed below and extending longitudinally of the kneading chamber and projecting beyond one end of the same, said feeder casings being of different lengths, delivery nozzles upon the ends of the feeder casings, and feeder screws within said casings, said screws having pairs of feeder blades at their delivery ends, the convolutions of the said blades alternating.

7. A pie-marking machine comprising a kneading chamber, kneading devices therein, tubular feeder casings disposed below and in communication with the kneading chamber and extending longitudinally thereof and beyond one end of the same, spiral ribs upon the inner surfaces of the feeder casings, feeder screws extending longitudinally within said casings, and delivery nozzles fitted upon the outer ends of the said casings, said nozzles being spaced to deliver the dough successively to a pie pan.

8. A pie-making machine comprising a conveyer belt to carry pie pans to and past a filling point, a kneading chamber disposed above the belt, dough-feeding devices extending longitudinally of the belt below and in communication with the kneading chamber, and delivery nozzles at the ends of said feeding devices, said nozzles being diverged laterally so as to extend transversely over the conveyer belt and having restricted discharge openings whereby to deliver dough in sheets to pans upon the belt.

9. A pie-making machine comprising a conveyer belt having pan-receiving openings at intervals therein, brackets upon the belt alternating with said openings, a kneading chamber disposed above the belt, a pie pan holder located above the belt, a filler reservoir also located above the belt, the filler reservoir and the pan holder being arranged at opposite ends of the kneading chamber, means for delivering dough from the kneading chamber in sheets successively to pans carried by the belt, means actuated by the brackets on the belt to deliver pans successively and singly to the openings in the belt, and means controlled by said brackets for delivering filling between the sheets of dough.

10. A pie-making machine comprising means for delivering pie pans successively and singly to a filling point, means for delivering sheets of dough upon the pans at opposite sides of said filling point, a filler reservoir, a discharge spout leading from the reservoir to the filling point, a filler cut-off at the bottom of the reservoir, a rocking arm secured to said cut-off, brackets upon the conveyer belt, said rocking arm being adapted to be actuated by the said brackets whereby a measured quantity of filler will be delivered between the sheets of dough, and means for normally holding said rocker arm in retracted position.

11. A pie-making machine comprising a conveyer belt to carry pie pans singly and successively to a filling point and a point of delivery, means for successively delivering sheets of dough upon the pans, means for delivering a filler between the sheets of dough, laterally swinging arms mounted above the conveyer belt adjacent the point of delivery, heads swiveled upon the free ends of said arms, yieldable means for maintaining said heads in the path of travel of the pies upon the belt, knives carried at the ends of the heads, and rollers on the under sides of the heads at the ends thereof whereby the travel of the pies will cause said heads to swing around the pies and trim excess dough from the edges of the same.

12. A pie-making machine comprising means for conveying pie pans to and past a filling point in a rectilinear path, means for delivering sheets of dough successively upon the pans, means for delivering a filler between the sheets of dough, trimming and crimping devices disposed above the conveying means adjacent the delivery point of the same and comprising arms mounted for swinging movement above the conveying means in a plane parallel to the plane of said means, means yieldably holding the free ends of said arms together and combined trimmers and crimpers at the free ends of said arms, and a lifting member below the conveying means whereby to guide the pies to the trimmers and crimpers as they travel past the mounted ends of the arms toward the free ends thereof, the pies impinging against the trimmers and crimpers and spreading the same whereby the trimmers and crimpers will roll around the edges of the pies and trim excess dough therefrom.

13. A pie-making machine comprising a conveyer belt to carry pie pans past a filling station, means for delivering sheets of dough successively upon the pans at the filling station, means for delivering a filler between the sheets of dough, a marking roller arranged to act upon the upper sheet of dough, means actuated by the conveyer belt for controlling the delivery of the filler, and means connected with the last-mentioned means for raising the marker roller during intervals between pies.

14. A pie-making machine comprising a conveyer belt to carry pie pans past a filling station, means for delivering dough upon the pans at the filling station, means for delivering a filler to the pans, means for sustaining a supply of pie pans above one end of the conveyer belt, rocking members disposed below said pan-sustaining means, means upon the belt for actuating said rocking members, and means on said rocking members for supporting the pans and delivering the same singly to the belt.

15. In a pie-making machine, means for maintaining a supply of pie pans in superposed relation, a conveyer belt traveling below said means, rocking members disposed at opposite sides of said means and having portions projecting normally over the conveyer belt, means on the belt to engage said portions and actuate the rocking members, yieldable means for holding the rocking members with the said portions over the belt, and spiral ribs on the said rocking members having their ends adapted to engage and support the lowermost pans whereby upon actuation of said members the lowermost pan will be delivered onto the belt.

16. In a pie-making machine, means for delivering pans at a filling point, means for delivering sheets of dough successively upon the pans, means for delivering a filler between the sheets of dough, a marker, and means controlled by the last-mentioned means for moving the marker to and from the upper sheet of dough.

17. In a pie-making machine, means for delivering pans at a filling point, means for delivering sheets of dough upon the pans, means for delivering a filler between the sheets of dough, a multiple-die marker, means for moving the marker to and from the upper sheet of dough, and means for adjusting the marker whereby to bring any die to the marking position.

18. In a pie-making machine, means for delivering pans at a filling point, means for delivering sheets of dough successively upon the pans, means for delivering a filler between the sheets of dough, a marker, a platen roller co-operating with the marker and over which the upper sheet of dough passes, andl means for applying flour to the surface of the platen roller.

In testimony whereof I affix my signature.

WILLIAM A. VAN LUVEN. [L. S.]